(12) United States Patent
Chen

(10) Patent No.: US 8,659,888 B2
(45) Date of Patent: Feb. 25, 2014

(54) DISK DRIVE ASSEMBLY

(75) Inventor: Yun-Lung Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 100 days.

(21) Appl. No.: 13/325,268

(22) Filed: Dec. 14, 2011

(65) Prior Publication Data

US 2012/0300388 A1 Nov. 29, 2012

(51) Int. Cl.
*G06F 1/16* (2006.01)
*H05K 5/00* (2006.01)
*H05K 7/00* (2006.01)

(52) U.S. Cl.
USPC .................................................. 361/679.33

(58) Field of Classification Search
USPC ........ 361/679.33–679.39, 728, 730, 732, 724
See application file for complete search history.

(56) References Cited

U.S. PATENT DOCUMENTS

| | | | | |
|---|---|---|---|---|
| 4,896,777 A | * | 1/1990 | Lewis | 211/41.17 |
| 5,588,728 A | * | 12/1996 | Eldridge et al. | 312/332.1 |
| 6,067,225 A | * | 5/2000 | Reznikov et al. | 361/679.31 |
| 6,166,901 A | * | 12/2000 | Gamble et al. | 361/679.34 |
| 7,106,596 B1 | * | 9/2006 | Reznikov | 361/724 |
| 7,382,610 B2 | * | 6/2008 | Lin et al. | 361/679.33 |
| 2003/0099094 A1 | * | 5/2003 | Coles et al. | 361/726 |
| 2004/0047122 A1 | * | 3/2004 | Chen et al. | 361/685 |
| 2009/0073649 A1 | * | 3/2009 | Ikeda et al. | 361/679.35 |
| 2010/0039765 A1 | * | 2/2010 | Antonuccio et al. | 361/679.34 |
| 2010/0103607 A1 | * | 4/2010 | Chen et al. | 361/679.36 |

* cited by examiner

*Primary Examiner* — Jinhee Lee
*Assistant Examiner* — Xanthia C Cunningham
(74) *Attorney, Agent, or Firm* — Altis Law Group, Inc.

(57) ABSTRACT

A disk drive assembly includes a disk drive and a drive bracket. The disk drive includes a first sidewall. The first sidewall includes a first sidewall body, a first resilient tab and a second resilient tab. The first resilient tab and the second resilient tab extend outward from the sidewall body. An extending direction of the first resilient tab is opposite to an extending direction of the second resilient tab. The drive bracket includes a bottom panel and a first side panel substantially perpendicular to the bottom panel. The first side panel is substantially parallel to the first sidewall body. The disk drive is located on the bottom panel. The drive bracket further includes two resilient protrusions extending from the first side panel. The two resilient protrusions resiliently resist the first resilient tab and the second resilient tab.

13 Claims, 3 Drawing Sheets

DISK DRIVE ASSEMBLY

CROSS-REFERENCE TO RELATED APPLICATIONS

This application is related to co-pending U.S. patent application, entitled "DISK DRIVE ASSEMBLY," U.S. application Ser. No. 13/296,537, filed on Nov. 15, 2011, and co-pending U.S. patent application, entitled "DISK DRIVE ASSEMBLY".

BACKGROUND

1. Technical Field

The disclosure generally relates to a disk drive assembly.

2. Description of Related Art

Disk drives, such as a hard disk drive or a compact disc read-only memory drive, usually require brackets may on a front plate of a computer enclosure to receive the drives. A large space is needed in the computer enclosure to install the disk drives. However, in some thin computer enclosures, the drives cannot be installed after a motherboard has been installed in the computer enclosure.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
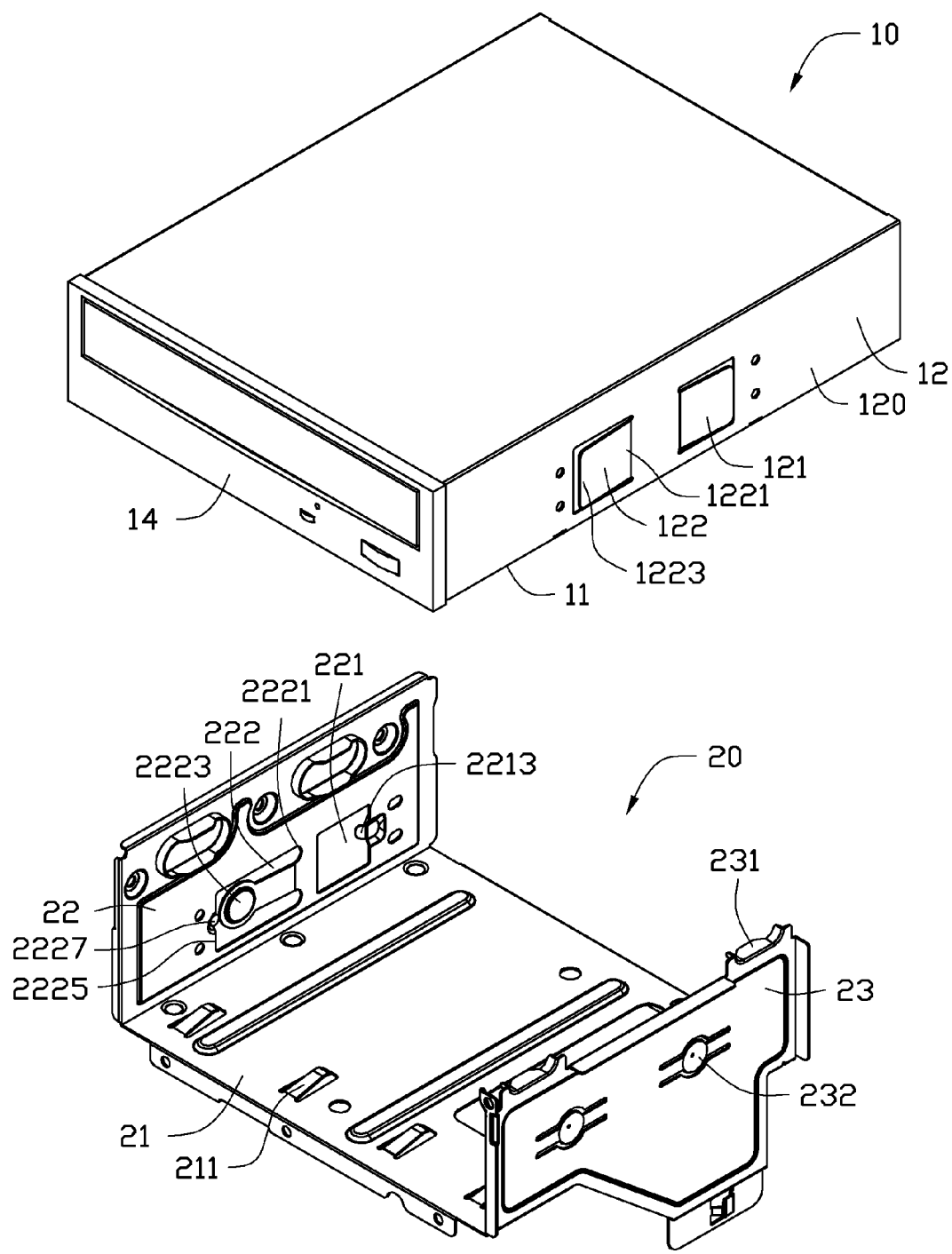
FIG. 1 is an exploded, isometric view of an embodiment of a disk drive assembly.
Figure 2:
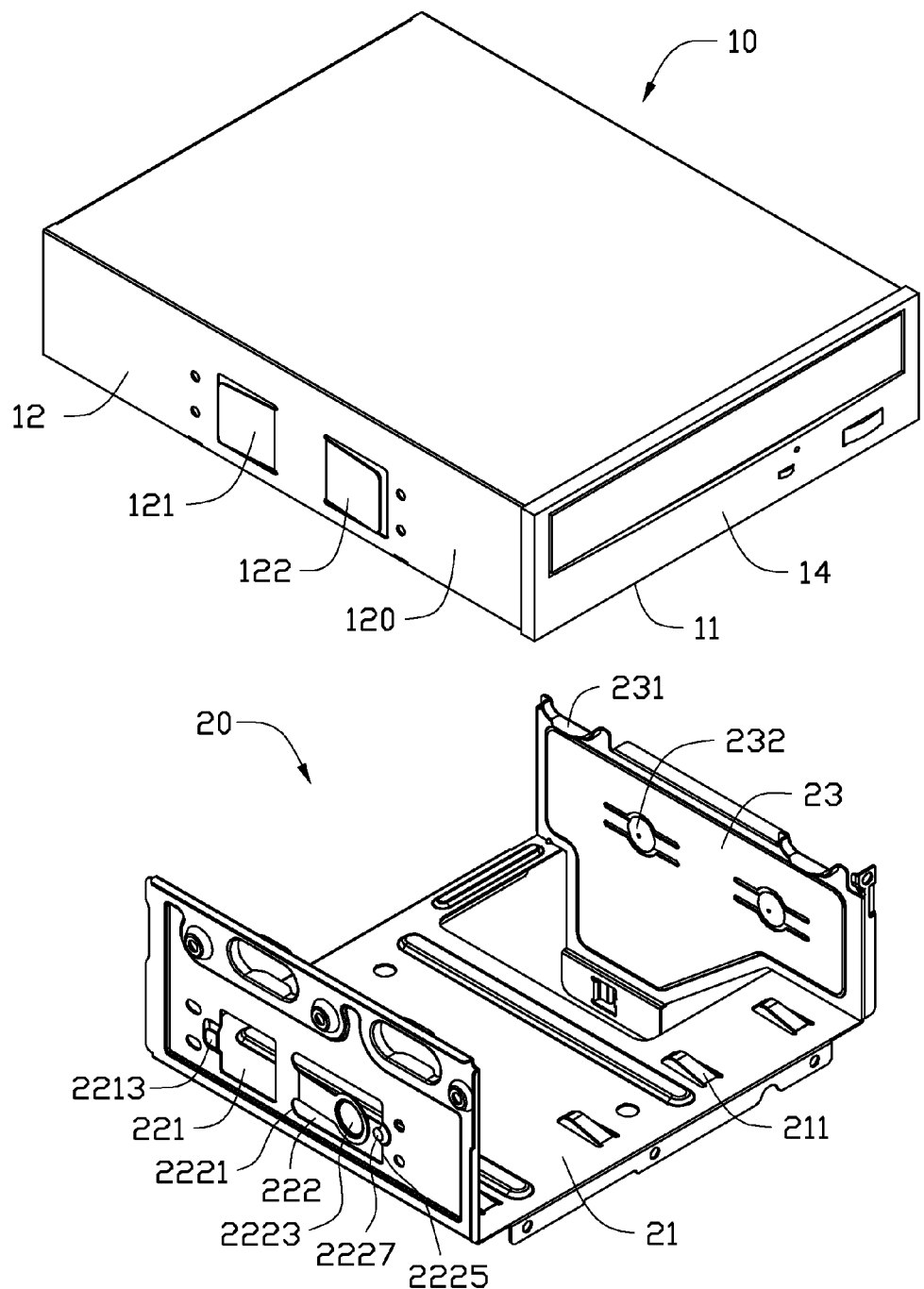
FIG. 2 is similar to FIG. 1, but viewed from another aspect.

Referring to FIGS. 1 and 2, a disk drive assembly in accordance with an embodiment includes a disk drive 10 and a drive bracket 20.

The disk drive 10 includes a bottom wall 11, two sidewalls 12 extending substantially perpendicularly from the bottom wall 11, and a front wall 14 connected between the two sidewalls 12. The first sidewall 12 includes a sidewall body 120, a first resilient tab 121 extending slightly outwardly from the sidewall body 120, and a second resilient tab 122 extending slightly outwardly from the sidewall body 120. A distance between the first resilient tab 121 and a connecting end 1221 of the second resilient tab 122 connected to the sidewall body 120 is less than a distance between the first resilient tab 121 and a free end 1223 of the second resilient tab 122. An extending direction of the first resilient tab 121 is substantially mirrored to the extending direction of the second resilient tab 122.

The drive bracket 20 includes a bottom panel 21, a first side panel 22 extending substantially perpendicularly from the bottom panel 21, and a second side panel 23 extending substantially perpendicularly from the bottom panel 21. The first side panel 22 is substantially parallel to the sidewall body 120.

A first securing opening 221 and a second securing opening 222 are defined in the first side panel 22. The drive bracket 20 includes a first stopper protrusion 2213 extending from an edge of the first securing opening 221. The drive bracket 20 further includes a resisting portion 2223 extending from a first edge 2221 of the second securing opening 222. The drive bracket 20 further includes a second stopper protrusion 2227 extending from a second edge 2225 of the second securing opening 222. The first edge 2221 is opposite to the second edge 2225.

The bottom panel 21 includes a plurality of contacting tabs 211 for contacting the bottom wall 11. The drive bracket 20 further includes two stopper portions 231 extending from an upper edge of the second side panel 23. The drive bracket 20 further includes two resilient protrusions 232 extending from the first second side panel 23. Each resilient protrusion 232 is semi-spherical shaped.

Figure 3:
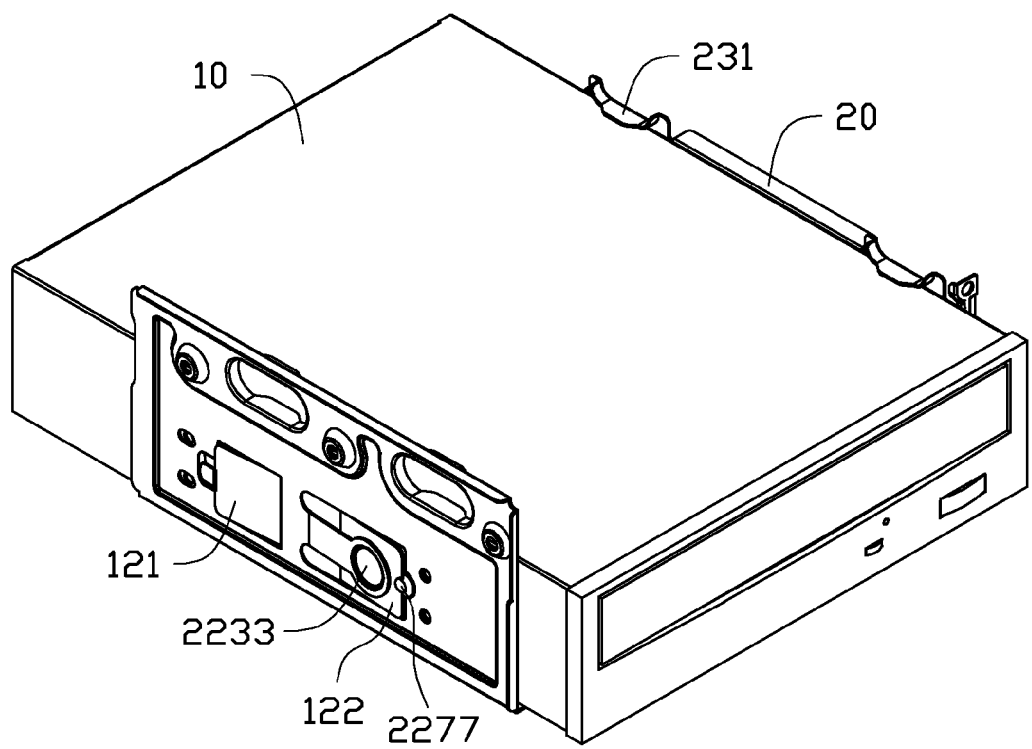
FIG. 3 is an assembled view of the disk drive assembly of FIG. 1.

Referring to FIGS. 1 to 3, in assembly, the disk drive 10 is aligned with the drive bracket 20. The disk drive 10 is moved to the drive bracket 20 to enable the first resilient tabs 121 to resist the inner surfaces of the first side panel 22 and the second side panel 23 of the drive bracket 20. The first resilient tabs 121 are deformed resiliently.

At this time, the bottom wall 11 of the disk drive 10 contacts the contacting tabs 211 of the drive bracket 20. The disk drive 10 is disposed between the stopper portions 231 and the bottom panel 21. The disk drive 10 is pushed inside the drive bracket 20 until the second resilient tabs 122 resist the inner surfaces of the first side panel 22 and the second side panel 23. The disk drive 10 is pushed again to align the first resilient tab 121 of one sidewall 12 with the first securing opening 221 and align the second resilient tab 122 of the one sidewall 12 with the second securing opening 222. The first resilient tab 121 and the second resilient tab 122 are released and engage in the first securing opening 221 and the second securing opening 222, respectively. The first resilient tab 121 is engaged in the first securing opening 221 to prevent the disk drive 10 from moving along a first direction. The second resilient tab 122 is engaged in the second securing opening 222 to prevent the disk drive 10 from moving along a second direction opposite to the first direction. The free end of the first resilient tab 121 resists the first stopper protrusion 2213. The free end of the second resilient tab 122 resists the second stopper protrusion 2227 of the drive bracket 20. The first resilient tab 121 and the second resilient tab 122 of the other sidewall 12 resist the resilient protrusions 232 of the second side panel 23.

In disassembly, the resisting portion 2223 is pressed to resist the corresponding second resilient tab 122. The corresponding second resilient tab 122 is deformed to move close to the sidewall body 120. The disk drive 10 is then pulled out of the drive bracket 20.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. disk drive assembly comprising:
a disk drive comprising a first sidewall and second sidewall, the first sidewall comprising a first sidewall body, a first resilient tab, and a second resilient tab, the first resilient tab and the second resilient tab extending outwardly from the first sidewall body, an extending direction of the first resilient tab substantially mirroring an extending direction of the second resilient tab the second sidewall comprising a second sidewall body, a third resilient tab, and a fourth resilient tab; the third resilient tab and the fourth resilient tab extending outwardly from the second sidewall body; and an extending direction of the third resilient tab substantially mirroring an extending direction of the fourth resilient tab; and a drive bracket comprising a bottom panel, a first side panel substantially perpendicular to the bottom panel, and a second side panel extending substantially perpendicularly from the bottom panel; wherein the first side panel is substantially parallel to the first sidewall body; the disk drive is located on the bottom panel; the drive bracket further comprises two resilient protrusions extending from the first side panel, and the two resilient protrusions resist the first resilient tab and the second resilient tab; the second side panel defines a first securing opening and a second securing opening; the third resilient tab is received in the first securing opening and resist an edge of the first securing opening to be prevented from moving along a first direction substantially parallel to the second side panel; and the fourth resilient tab is received in the second securing opening and resists an edge of the second securing opening to be prevented from moving a second direction substantially opposite to the first direction.

2. The disk drive assembly of claim 1, wherein the fourth resilient tab comprises a connecting end connected to the second sidewall body and a free end; a distance between the third resilient tab and the connecting end is less than a distance between the third resilient tab and the free end.

3. The disk drive assembly of claim 2, wherein the drive bracket further comprises a stopper protrusion extending from an edge of the second securing opening and the stopper protrusion resists the free end.

4. The disk drive assembly of claim 2, wherein the drive bracket comprises a resisting portion extending from an edge of the second securing opening; the resisting portion is adapted to press the fourth resilient tab to enable the fourth resilient tab to disengage from the second securing opening.

5. The disk drive assembly of claim 1, wherein the drive bracket further comprises a stopper protrusion extending from an edge of the first securing opening and the stopper protrusion resists a free end of the third resilient tab.

6. The disk drive assembly of claim 1, wherein the resilient protrusion is semi-spherical shaped.

7. The disk drive assembly of claim 1, wherein the drive bracket comprises a stopper portion extending from the first side panel, and the disk drive is located between the stopper portion and the bottom panel.

8. A disk drive assembly comprising:

a disk drive comprising a first sidewall, the first sidewall comprising a first sidewall body, a first resilient tab, and a second resilient tab, the first resilient tab and the second resilient tab extending slightly outward from the sidewall body, an extending direction of the first resilient tab substantially mirroring an extending direction of the second resilient tab; and a drive bracket comprising a bottom panel, a first side panel, and a second side panel substantially perpendicular to the bottom panel, wherein the first side panel is substantially parallel to the first sidewall body; the disk drive is located on the bottom panel and between the first side panel and the second side panel; the drive bracket further comprises two resilient protrusions extending from the first side panel; the two resilient protrusions are adapted to resiliently resist the first resilient tab and the second resilient tab to deform resiliently to move close to the first sidewall body, thereby preventing the disk drive from moving in a first direction substantially parallel to the first sidewall body; the drive bracket further comprises a stopper portion extending from the first side panel; the disk drive is located between the stopper portion and the bottom panel to prevent from moving in a second direction substantially perpendicular to the bottom panel wherein the second side panel defines a first securing opening and a second securing opening; the disk drive further comprises a second sidewall; the second sidewall comprises a second sidewall body, a third resilient tab, and a fourth resilient tab; the third resilient tab and the fourth resilient tab extending outwardly from the second sidewall body; and an extending direction of the third resilient tab substantially mirroring an extending direction of the fourth resilient tab; the first securing opening receives the third resilient tab to prevent the disk drive from moving along a third direction substantially parallel to the first direction, and the second securing opening receives the fourth resilient tab to prevent the disk drive from moving along a fourth direction substantially opposite to the third direction.

9. The disk drive assembly of claim 8, wherein the fourth resilient tab comprises a connecting end connected to the second sidewall body and a free end; a distance between the third resilient tab and the connecting end is less than a distance between the third resilient tab and the free end.

10. The disk drive assembly of claim 9, wherein the drive bracket further comprises a stopper protrusion extending from an edge of the second securing opening and the stopper protrusion resists the free end.

11. The disk drive assembly of claim 9, wherein the drive bracket comprises a resisting portion extending from an edge of the second securing opening; the resisting portion is adapted to press the fourth resilient tab to enable the fourth resilient tab to disengage from the second securing opening.

12. The disk drive assembly of claim 8, wherein the drive bracket further comprises a stopper protrusion extending from an edge of the first securing opening and the stopper protrusion resists a free end of the third resilient tab.

13. The disk drive assembly of claim 8, wherein the resilient protrusion is semi-spherical shaped.

* * * * *